(12) United States Patent
Calvo Martinez et al.

(10) Patent No.: US 11,215,225 B2
(45) Date of Patent: Jan. 4, 2022

(54) BEARING ARRANGEMENT

(71) Applicants: ZF Active Safety GmbH, Koblenz (DE); ZF Friedrichshafen AG, Friedrichshafen (DE)

(72) Inventors: José Manuel Calvo Martinez, Kruft (DE); Stefan Kammers, Oberstadtfeld (DE); Karl-Josef Adams, Münstermaifeld (DE); Martin Hofmann, Mendig (DE); Oliver Schell, Vogt (DE)

(73) Assignees: ZF Friedrichshafen AG, Friedrichshafen (DE); ZF Active Safety GmbH, Koblenz (DE)

( * ) Notice: Subject to any disclaimer, the term of this patent is extended or adjusted under 35 U.S.C. 154(b) by 0 days.

(21) Appl. No.: 16/686,132

(22) Filed: Nov. 16, 2019

(65) Prior Publication Data
US 2020/0158170 A1     May 21, 2020

(30) Foreign Application Priority Data

Nov. 16, 2018  (DE) .......................... 102018009030.3

(51) Int. Cl.
*F16C 27/08*     (2006.01)
*F16C 17/04*     (2006.01)
*F16H 57/021*    (2012.01)

(52) U.S. Cl.
CPC .............. *F16C 27/08* (2013.01); *F16C 17/04* (2013.01); *F16H 57/021* (2013.01); *F16H 2057/0213* (2013.01)

(58) Field of Classification Search
CPC .......... F16C 17/04; F16C 17/08; F16C 19/12; F16C 27/08; F16H 57/021; F16H 2057/0213; H02K 7/10
See application file for complete search history.

(56) References Cited

U.S. PATENT DOCUMENTS

| 3,836,214 | A | * | 9/1974 | Gengard | ............... | F16C 23/048 384/245 |
| 4,792,245 | A | * | 12/1988 | Fuke | ....................... | F16C 17/08 384/610 |
| 5,886,438 | A | * | 3/1999 | Kawanishi | ............. | H02K 37/14 310/90 |
| 6,951,424 | B2 | * | 10/2005 | Mutai | ..................... | F16C 17/08 384/610 |
| 10,718,345 | B2 | * | 7/2020 | Gashi | .................... | F04D 29/059 |

(Continued)

FOREIGN PATENT DOCUMENTS

| DE | 8812071 U1 | 1/1990 |
| DE | 19727119 C1 | 7/1998 |

(Continued)

*Primary Examiner* — Alan B Waits
(74) *Attorney, Agent, or Firm* — Robert James Harwood

(57) ABSTRACT

The present disclosure relates to a bearing arrangement for supporting a shaft, in particular a shaft of a gearing mechanism for an electromechanical brake booster, having: at least one bearing, a shaft, which is at least section-wise accommodated in the at least one bearing and has a protruding, rounded region on at least one of its axial end surfaces, at least one spring element, that engages the protruding, rounded region in order to prestress the shaft in the axial direction.

11 Claims, 3 Drawing Sheets

(56) References Cited

U.S. PATENT DOCUMENTS

| | | | |
|---|---|---|---|
| 2004/0146230 A1* | 7/2004 | Lau | F16C 17/08 384/420 |
| 2006/0078241 A1* | 4/2006 | Moehring | F16C 27/08 384/223 |
| 2007/0222313 A1* | 9/2007 | Sonohara | F16C 17/08 310/90 |
| 2008/0282697 A1* | 11/2008 | Klimes | F15B 7/08 60/562 |
| 2010/0154574 A1* | 6/2010 | Oberle | F16C 25/04 74/409 |
| 2018/0142790 A1* | 5/2018 | Rybarz | F16C 25/083 |

FOREIGN PATENT DOCUMENTS

| | | |
|---|---|---|
| DE | 19714237 C1 | 10/1998 |
| EP | 0655358 A1 | 5/1995 |
| WO | 2017046380 A1 | 3/2017 |

* cited by examiner

BEARING ARRANGEMENT

CROSS-REFERENCE TO RELATED APPLICATION

This application claims priority to German Patent Application No. 102018009030.3, filed Nov. 16, 2018, the disclosure of which is incorporated herein by reference in its entirety.

TECHNICAL FIELD

The present disclosure relates to a bearing arrangement for a shaft. A bearing arrangement of this kind can particularly be used for supporting a shaft in a gearing mechanism of an electromechanical brake booster. The present disclosure also relates to a spring element for such a bearing arrangement.

In addition to a radial needle bearing, known bearing arrangements frequently also comprise an axial needle bearing. The radial needle bearings and the axial needle bearings, as separate elements or as an integrated unit, are needed to support the shaft. Because of the recesses that must be provided for the radial needle bearing and axial needle bearing and because of the snug fits that have to be planned, bearing arrangements with needle bearings are extremely complicated to manufacture and install.

SUMMARY

One object of the present disclosure, therefore, is to produce a bearing arrangement that is simple to install and is able to support a shaft in the axial direction. This object is attained with the features of claim 1. Preferred embodiments are disclosed in the dependent claims.

The bearing arrangement for supporting a shaft comprises at least one bearing and at least one shaft, which has a protruding, rounded region on at least one of its axial end surfaces. The shaft is at least sectionwise accommodated in the at least one bearing. The bearing arrangement also comprises at least one spring element. The at least one spring element engages the protruding, rounded region in order to prestress the shaft in the axial direction.

Because of the at least one spring element, an end section of the shaft can be inserted into the bearing without requiring additional snug fits or a pressing of the shaft into the bearing. The at least one spring element prestresses the shaft in the axial direction. With the at least one spring element, it is possible to absorb and compensate for axial movements of the shaft through an elastic deformation of the spring element. The permissible magnitude of the axial movements of the shaft is predetermined by the at least one spring element. Because of the protruding, rounded region of the shaft, which is in contact with the at least one spring element, the shaft is able to rotate without perceptible additional friction influences impeding the rotation of the shaft. With the pairing of the at least one spring element and the rounded region protruding in the axial direction on the end surface of the at least one shaft, it is thus possible to dispense with cost-intensive axial needle bearings or axial ball bearings for supporting the shaft.

At each of its end surfaces, the shaft can have a protruding, rounded region. The protruding, rounded region can be composed of at least one insert element. The insert element can be at least partially accommodated in an opening in the end surface of the shaft, which is embodied to accommodate the insert element. At each of its end surfaces, the shaft can be provided with such an opening, which partially accommodates an insert element. The insert element can be pressed into the opening in the end surface of the shaft. Alternatively, the protruding, rounded region can also be embodied on the end surface of the shaft itself. The protruding, rounded region can be embodied on each of the end surfaces of the shaft. The protruding, rounded region can thus be embodied as being of one piece with the shaft. The at least one insert element can be a ball. Furthermore, the at least one insert element can be an element with at least one rounded surface. This element can have an end surface, which is embodied as rounded. This element can also be embodied with a cross-section that is round or polygonal and can be accommodated in the opening of the end surface of the shaft.

The bearing arrangement can comprise at least one housing section. The at least one housing section can form a bearing seat for accommodating the at least one bearing. The housing section can also accommodate the at least one spring element. The at least one bearing can thus be accommodated in the at least one housing section. The at least one bearing can be accommodated in the at least one housing section by means of a snug fit. The at least one housing section can comprise a cylindrical section and a wall section, which is positioned at the end of the cylindrical section in the axial direction and is connected to it. The wall section can extend at right angles to the central axis of the shaft. The at least one spring element can be positioned between the wall section and the bearing. The at least one bearing can rest with its outer circumference surface against the inner circumference surface of the cylindrical section of the at least one housing section.

The at least one spring element can be supported against the at least one housing section. It can be positioned between the wall section and the end surface of the shaft. The at least one spring element can be supported against the wall section of the housing section in order to prestress the shaft in the axial direction. The spring element can rest against the wall section.

The at least one spring element can be embodied in such a way that it is supported against the at least one bearing, in particular against an outer bearing ring of the at least one bearing. The at least one spring element can be positioned between the wall section and the bearing in the axial direction. The at least one spring element can thus be supported against the wall section and the outer bearing ring of the at least one bearing. The at least one spring element can have at least one base, which is supported against the at least one bearing. The at least one base can be supported against the outer bearing ring of the bearing. The at least one base can extend from a base body of the at least one spring element. The base body can rest against the wall section of the at least one housing section. The at least one spring element can extend from the base body, curved in the direction of the at least one bearing. The at least one base can have a contacting claw at its end, which can rest against the outer bearing ring of the bearing. The at least one spring element can comprise three bases, which each have a contacting claw. Each contacting claw can extend radially inward.

The at least one spring element can have at least one spring arm for axially prestressing the shaft. The at least one spring arm can extend from the base body of the spring element. The at least one spring arm can have a curved spring section and a contacting section that can rest against the protruding, rounded region. The contacting section of the spring arm is connected to the base body of the spring element by means of the spring section. The contacting section can extend at a distance from the base body. The distance between the base body and the contacting section dictates the maximum allowable deformation of the spring arm and thus the maximum allowable displacement of the shaft in the axial direction. If the spring arm is supported against the base body, then the axial displacement of the shaft is limited. The contacting section of the spring arm can partially overlap with the base body. The spring section can produce at least a part of the prestressing force for the axial prestressing of the shaft. The contacting section of the spring arm can extend at an angle relative to the base body. This increases the distance between the contacting section and the base body in the direction of the free end of the contacting section.

The present disclosure also relates to a spring element for axially prestressing a shaft. The spring element comprises a base body, at least one spring arm, and at least one base. The at least one spring arm extends from the base body. The at least one base also extends from the base body. The at least one spring arm has a spring section and a contacting section; the contacting section can be displaced in the direction of the base body through elastic deformation of the spring section.

With its contacting section, the spring arm can establish a predetermined distance from the base body. This distance predetermines the maximum allowable spring travel of the spring arm. If the contacting section of the spring arm comes into contact with the base body, this prevents or impedes a further elastic deformation of the spring section. This can also effectively limit the above-described displacement of the shaft in the axial direction by means of the spring element. The spring element can be embodied of one piece.

The at least one base can have a contacting claw at its end. The at least one spring element can comprise three bases, which each have a contacting claw. Each contacting claw can extend radially inward from the associated base.

The present disclosure also relates to an electromechanical brake booster with a bearing arrangement of the above-described type or a spring element according to the description above.

BRIEF DESCRIPTION OF THE DRAWINGS

Exemplary embodiments of the present disclosure are explained in greater detail below with reference to the accompanying schematic figures. In the drawings.

DETAILED DESCRIPTION

Figure 1:
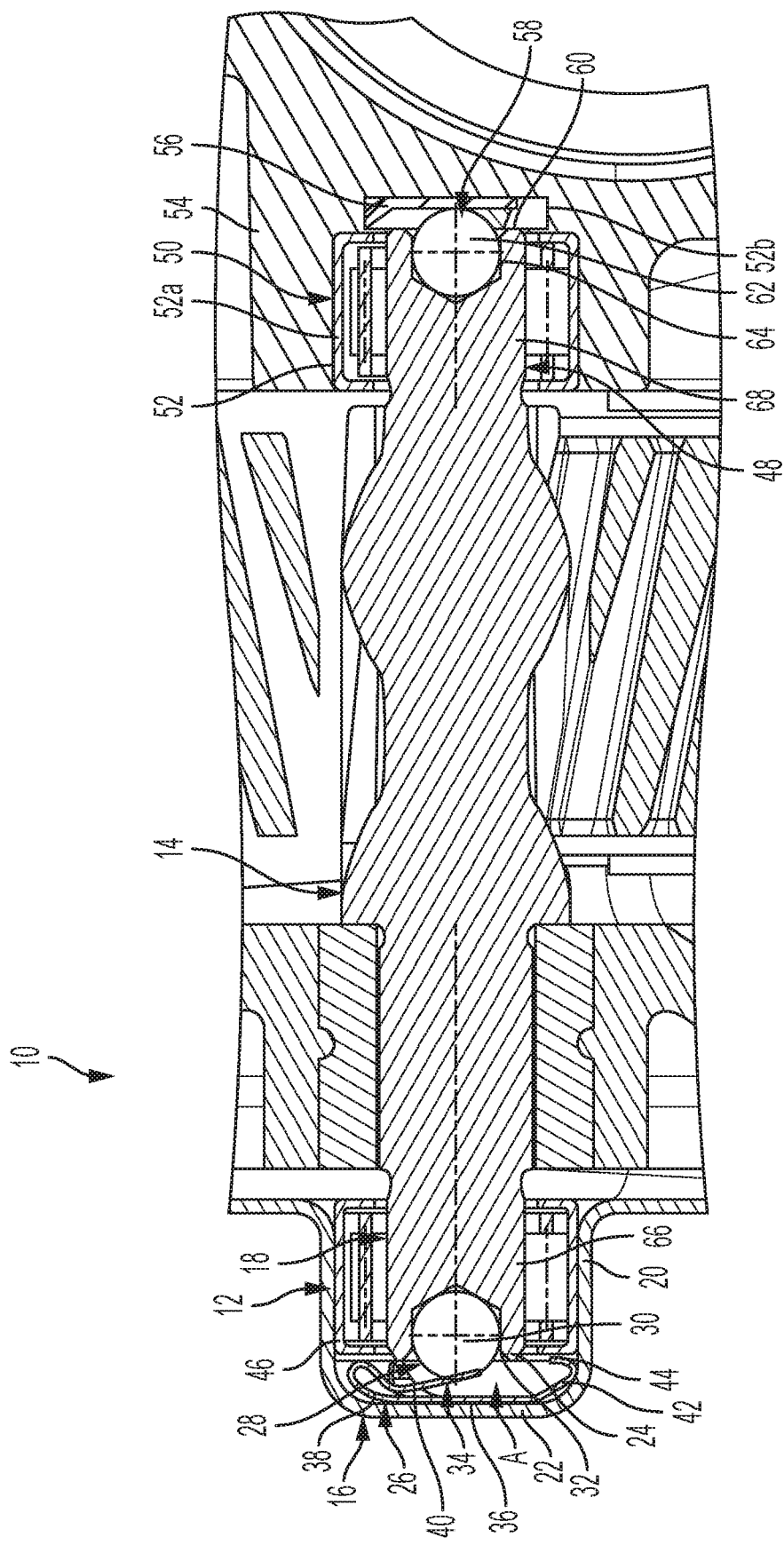
FIG. 1 shows a sectional view of a bearing arrangement according to a first exemplary embodiment.

FIG. 1 shows a sectional view of a bearing arrangement 10 according to a first exemplary embodiment. The bearing arrangement 10 comprises a bearing 12 for a shaft 14. The bearing 12 is embodied as a needle bearing and is accommodated in a housing section 16 of the bearing arrangement, which defines a bearing seat for the bearing 12. An end section 18 of the shaft 14 is accommodated in rotary fashion in the bearing 12.

The housing section 16 comprises a cylindrical section 20 and a wall section 22 that adjoins the cylindrical section 20 at one end of the cylindrical section 20. The wall section 22 extends in the radial direction and at right angles to the central axis of the shaft 14 and extends essentially parallel to an axial end surface 24 of the shaft 14.

Also accommodated in the housing section 16 is a spring element 26, which is positioned in the axial direction of the shaft 14 between the wall section 22 on the one hand and the bearing 12 and end section 18 of the shaft 14 on the other. The spring element 26 serves to prestress the shaft 14 in the axial direction. In order to prestress the shaft 14 in the axial direction, the spring element 26 engages with a protruding, rounded region 28 on the end surface 24 of the shaft 14. The protruding, rounded region 28 in this case is composed of a ball 30 that is accommodated in an opening 32 in the end surface 24 of the shaft 14. The ball 30 can be pressed into the opening 32. The opening 32 has a cylindrical section and a conically tapering section on which the ball 30 can be supported. The ball 30 can be inserted or pressed into the opening 32 until a hemispherical section or a smaller section of the ball 30 protrudes from the opening 32 in the axial direction.

By means of a spring arm 34, the spring element 26 contacts the protruding, rounded region 28 and/or the ball 30. The spring arm 34 extends from a base body 36 of the spring element 26 and comprises a spring section 38 and a contacting section 40 with which the spring element 26 rests against and can engage the protruding, rounded region 28 and/or the ball. The curved spring section 38 extends in a loop between the contacting section 40 and the base body 36. A distance is established between the base body 36 and the contacting section 40 in the axial direction. This distance A exists in the direction of the central axis of the shaft 14 between the contacting section 40 and the base body 36. The distance A increases along the contacting section 40 toward the free end of the contacting section 40. The smallest distance between the base body 36 and the contacting section 40 is thus present at the transition from the spring section 38 to the contacting section 40. This section defines a maximum allowable axial displacement of the shaft 14 that can be absorbed by an elastic deformation of the spring section 38 of the spring arm 34.

The spring element 26 also has bases 42, only one of which is fully shown in FIG. 1. The bases 42 are supported against the bearing 12. For this purpose, the bases 42 have contacting claws 44 at their ends. The contacting claws 44 extend radially inward from each base. The bases 42 are supported by means of the contacting claws 44 against an outer bearing ring 46 of the bearing 12. The supporting legs 42 can also support the bearing 12 in the axial direction. The base body 36 of the spring element 26 rests with its surface oriented away from the shaft 14 against the wall section 22 of the housing section 16. Starting from the base body 36, the spring arm 34 and the bases 42 extend in a curved fashion in the direction of the bearing 12 and shaft 14. If a displacement of the bearing 12 in the axial direction occurs, then this displacement can be absorbed by the bases 42.

The shaft 14 comprises another end region 48, which, like the end region 18, is accommodated in a bearing 50. The bearing 50 is accommodated in an opening 52 of a housing section 54. The opening 52 is embodied as stepped and has a section 52a with a larger diameter and a shorter section 52b with a smaller diameter. The bearing 50 is accommodated in the section 52a with the larger diameter. A bearing element 56 is accommodated in the section 52b with the smaller diameter. The shaft 14 is supported against the bearing element 56 with another protruding, rounded region 58 at the other end surface 60 of the shaft 14. The other end surface 60 is situated at the opposite end from the end surface 24 of the shaft 14. The protruding, rounded region 58 in this case is formed by a ball 62, which is accommodated in an opening 64 in the end surface 60 of the shaft 14. The protruding, rounded region 58 formed by the ball 62 can rest against a bearing element 56 and support the shaft 14 radially. The ball 62 produces a low-friction contact with the bearing element 56.

The two end regions 18 and 48 of the shaft 14 have a regular outer circumference surface 66 and 68 without projections and steps or the like. As a result, the shaft 14 can be inserted into the bearings 12 and 52 quickly and simply. Because of the spring element 26 and the protruding, rounded regions 28 and 58, it is no longer necessary to provide cost-intensive and difficult-to-install axial needle bearings. The bearing arrangement 10 can thus be installed quickly and simply with inexpensive components.

Figure 2:
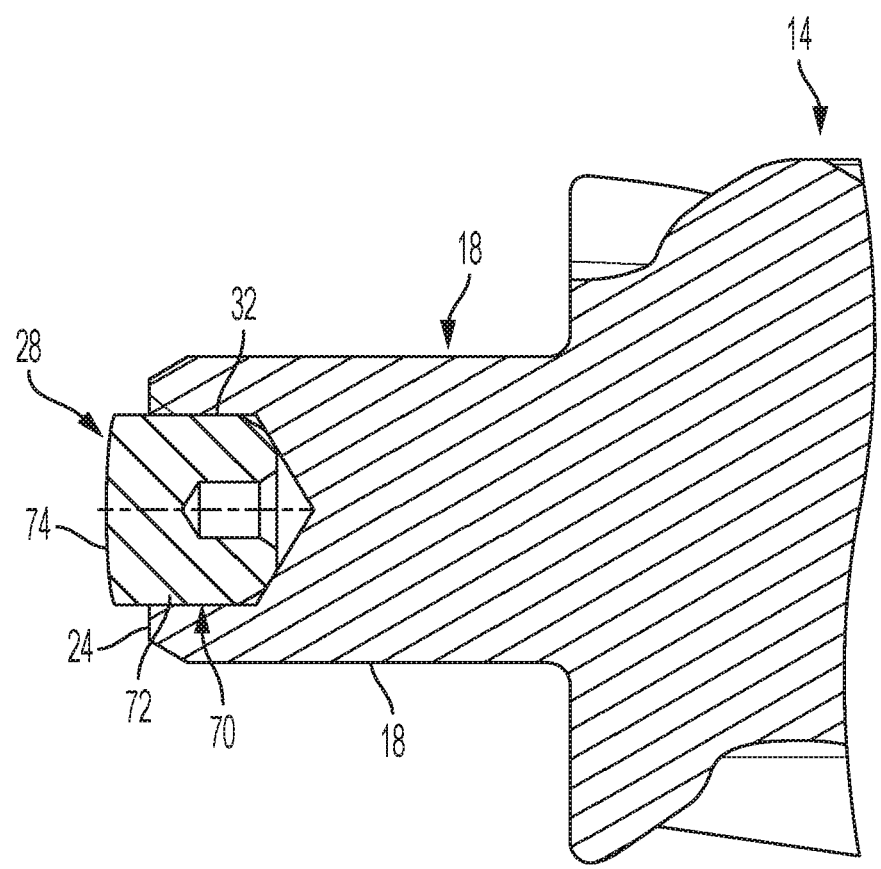
FIG. 2 shows a sectional view of a shaft and an insert element according to a second exemplary embodiment.

FIG. 2 shows a partial sectional view of the shaft 14 with a protruding, rounded region 28 that is formed by an insert element 70. The insert element 70 is accommodated in the opening 32 in the end surface 24 of the shaft 14. The insert element 70 has a cylindrical section 72 and a rounded end surface 74 that forms the rounded region 28 and can be brought into contact with a spring element 26 (see FIG. 1). The insert element 70 protrudes beyond the end surface 24 of the shaft 14 in the axial direction. With the outer circumference surface of the cylindrical section 72, the insert element 70 can rest against the inner circumference surface of the opening 32 in a manner analogous to the first exemplary embodiment.

If the shaft 14 with the insert element 70 for the bearing arrangement 10 is used, then the spring element 26 (see FIG. 1) engages the rounded end surface 74 of the insert element 70. The rounded end surface 74 enables a low-friction contact with the spring arm 34 of the spring element 26 when the shaft 14 rotates.

Figure 3:
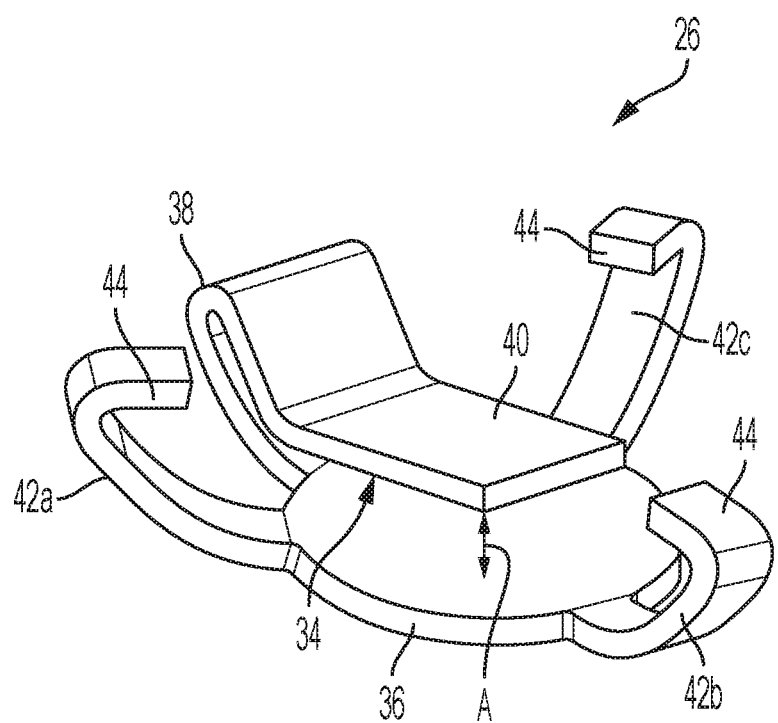
FIG. 3 shows a perspective view of a spring element.

FIG. 3 shows a perspective view of an exemplary embodiment of the spring element 26. The spring element 26 has a base body 36 from which three bases 42a, 42b, 42c extend. A spring arm 34 also extends from the base body 36. The spring arm 34 has a spring section 38 and a contacting section 40. The spring section 38 extends in a loop between the contacting section 40 and the base body 36. The contacting section 40 at least partially overlaps with the base body.

Between the contacting section 40 and the base body 36, a distance A in the axial direction is established, which increases along the contacting section 40 in the direction of the free end of the contacting section 40. The region of the smallest distance A between the base body 36 and the contacting section 40 establishes the maximum allowable spring travel of the spring arm 40 relative to the base body 36 or more precisely, in the direction of the base body 36. The smallest distance between the contacting section 40 and the base body 36 lies in the region of the transition between the spring section 38 and the contacting section 40. If the contacting section 40 of the spring arm 34 comes into contact with the base body 36, then the elastic deformation of the spring section 38 is limited and/or significantly impeded. In this way, the magnitude of a displacement of the shaft 14 (see FIGS. 1 and 2) in the axial direction is effectively limited by means of the spring element 26.

The bases 42 extend starting from a circumference surface of the base body 36, which in this case is embodied as at least partially circular. The bases 42a, 42b, and 42c are curved on the same side of the base body 36 as the spring arm 34. At their ends, the bases 42a, 42b, 42c have contacting claws 44, which extend radially inward from the associated base and in this case, extend at least essentially parallel to the base body 36.

What is claimed is:

1. A bearing arrangement for supporting a shaft of a gearing mechanism for an electromechanical brake booster, having:
   at least one bearing,
   the shaft, which is at least section-wise accommodated in the at least one bearing and has a protruding, rounded region on at least one of its end surfaces positioned along an axis,
   at least one spring element, which is supported against and engages the at least one bearing and engages the protruding, rounded region in order to prestress the shaft in the axial direction, wherein spaced-apart portions of the at least one spring element are aligned with the axis of the shaft and cooperate to define a maximum allowable displacement of the shaft.

2. The bearing arrangement according to claim 1, in which the protruding, rounded region is formed by at least one insert element at least partially accommodated in an opening in the end surface of the shaft or by the end surface of the shaft itself.

3. The bearing arrangement according to claim 2, in which the at least one insert element is a ball or an element with at least one rounded surface.

4. The bearing arrangement according to claim 1, with at least one housing section, which accommodates the spring element and the bearing.

5. The bearing arrangement according to claim 4, in which the at least one spring element is supported against the housing section.

6. The bearing arrangement according to claim 1, wherein one of the spaced-apart portions comprises a base, supported in the axial direction against the at least one bearing and engages an axial end surface of the at least one bearing.

7. The bearing arrangement according to claim 1, wherein one of the spaced-apart portions comprises a spring arm for coming into contact with the protruding, rounded region of the shaft.

8. The bearing arrangement according to claim 1, wherein the spaced-apart portions comprise:
   a base body supported in the axial direction by a housing section that accommodates the spring element and the bearing; and
   a spring arm for coming into contact with the protruding, rounded region of the shaft.

9. A spring element for axially prestressing a shaft, having:
   a base body,
   at least one spring arm, which extends from a periphery of the base body, and
   bases that extend from the base body and terminate at free ends comprising a contacting claw extending inward towards the at least one spring arm,
   wherein the at least one spring arm has a spring section and a contacting section and the contacting section can be displaced in the direction of the base body through elastic deformation of the spring section.

10. The spring element according to claim 9, wherein the contacting claws extend towards one another.

11. The spring element according to claim 9, wherein the contacting section is movable into engagement with the base body in response to elastic deformation of the spring section.

* * * * *